US012634979B2

(12) United States Patent
Hong et al.

(10) Patent No.: US 12,634,979 B2
(45) Date of Patent: May 19, 2026

(54) RANDOM ACCESS METHOD AND DEVICE

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 488 days.

(21) Appl. No.: 18/012,822

(22) PCT Filed: Jul. 28, 2020

(86) PCT No.: PCT/CN2020/105165
§ 371 (c)(1),
(2) Date: Dec. 23, 2022

(87) PCT Pub. No.: WO2022/021059
PCT Pub. Date: Feb. 3, 2022

(65) Prior Publication Data
US 2023/0262746 A1     Aug. 17, 2023

(51) Int. Cl.
H04W 72/542        (2023.01)
H04W 74/00         (2009.01)
(Continued)

(52) U.S. Cl.
CPC ....... H04W 72/542 (2023.01); H04W 74/002 (2013.01); H04W 74/0833 (2013.01); H04W 74/0836 (2024.01); H04W 88/06 (2013.01)

(58) Field of Classification Search
CPC ............. H04W 72/542; H04W 74/002; H04W 74/0833; H04W 88/06
See application file for complete search history.

(56) References Cited

U.S. PATENT DOCUMENTS 10,785,801 B2 *  9/2020  Li ..................... H04W 74/0833
2019/0239167 A1  8/2019  Liu et al.
(Continued)

FOREIGN PATENT DOCUMENTS

| CN | 108271214 A | 7/2018 |
| CN | 111278153 A | 6/2020 |
| CN | 111405675 A | 7/2020 |

OTHER PUBLICATIONS

European Patent Application No. 20947287.7, Search and Opinion dated Feb. 22, 2024, 9 pages.
(Continued)

*Primary Examiner* — Gbemileke J Onamuti
(74) *Attorney, Agent, or Firm* — Cozen O'Connor

(57)                ABSTRACT

A base station in a wireless communication network sends indication information to a terminal or user equipment. The indication information is configured to indicate that the terminal should perform a random access procedure in a target mode when an initiated multi-modal communication or service meets a target condition. The terminal receives the indication information, determines according to the indication information, a target mode for performing random access procedure when an initiated multi-modal communication or service meets a target condition; and performs random access procedure in the target mode when the initiated multi-modal communication or service meets the target condition.

16 Claims, 5 Drawing Sheets

(51) Int. Cl.

| | |
|---|---|
| *H04W 74/08* | (2024.01) |
| *H04W 74/0833* | (2024.01) |
| H04W 74/0836 | (2024.01) |
| H04W 88/06 | (2009.01) |

(56) References Cited

U.S. PATENT DOCUMENTS

| | | | | |
|---|---|---|---|---|
| 2019/0373644 A1 | 12/2019 | Wang et al. | | |
| 2019/0380156 A1 | 12/2019 | Akkarakaran et al. | | |
| 2020/0022038 A1 | 1/2020 | Han et al. | | |
| 2020/0314913 A1* | 10/2020 | Rastegardoost | ...... | H04W 74/04 |
| 2021/0099254 A1* | 4/2021 | Babaei | .................. | H04W 72/23 |

OTHER PUBLICATIONS

Indian Patent Application No. 202347006284, Office Action dated Mar. 11, 2024, 6 pages.

Zte et al. "Considerations on 2-Step RACH Procedures" 3GPP TSG RAN WG1 Meeting #96, R1-1901627, Feb.-Mar. 2019, 11 pages.

PCT/CN2020/105165 English translation of International Search Report dated Apr. 25, 2021, 2 pages.

Chinese Patent Application No. 202080001667.7, Office Action with English translation dated Jun. 3, 2023, 19 pages.

\* cited by examiner

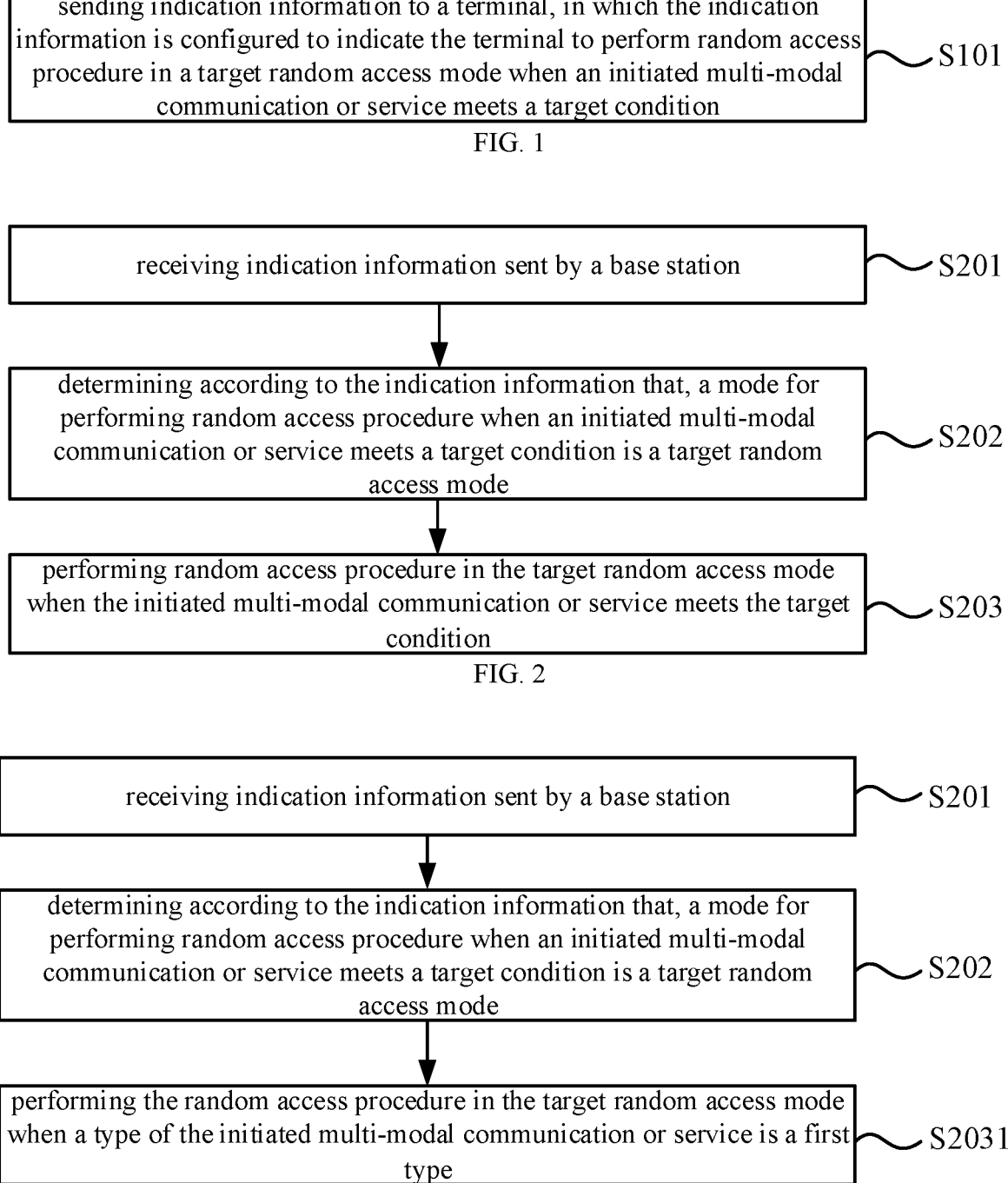

sending indication information to a terminal, in which the indication information is configured to indicate the terminal to perform random access procedure in a target random access mode when an initiated multi-modal communication or service meets a target condition    ⟋S101

FIG. 1 receiving indication information sent by a base station    ⟋S201 determining according to the indication information that, a mode for performing random access procedure when an initiated multi-modal communication or service meets a target condition is a target random access mode    ⟋S202 performing random access procedure in the target random access mode when the initiated multi-modal communication or service meets the target condition    ⟋S203

FIG. 2 receiving indication information sent by a base station    ⟋S201 determining according to the indication information that, a mode for performing random access procedure when an initiated multi-modal communication or service meets a target condition is a target random access mode    ⟋S202 performing the random access procedure in the target random access mode when a type of the initiated multi-modal communication or service is a first type    ⟋S2031

FIG. 3

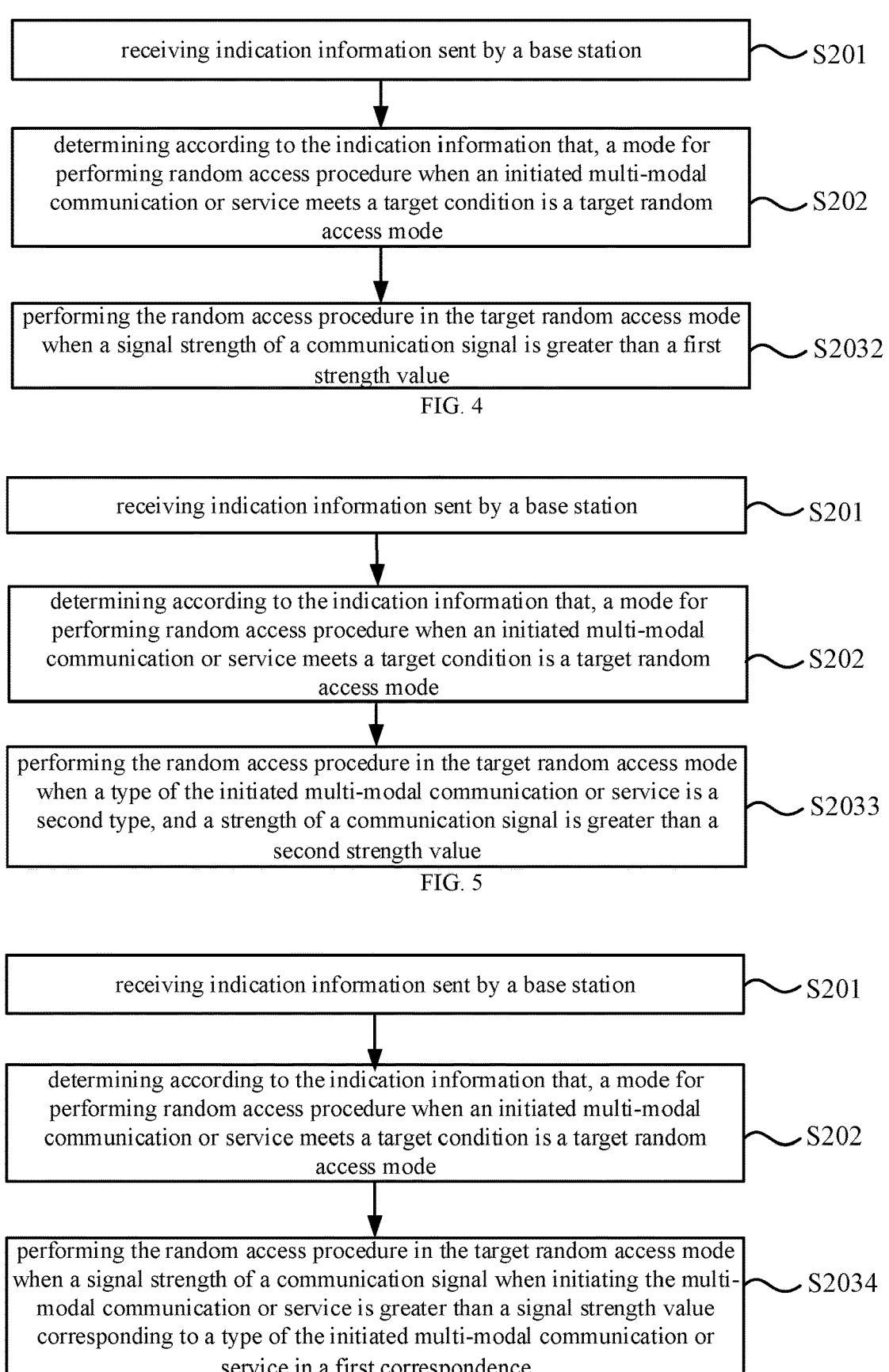

receiving indication information sent by a base station ⟩~S201 determining according to the indication information that, a mode for performing random access procedure when an initiated multi-modal communication or service meets a target condition is a target random access mode ⟩~S202 performing the random access procedure in the target random access mode when a signal strength of a communication signal is greater than a first strength value ⟩~S2032

FIG. 4 receiving indication information sent by a base station ⟩~S201 determining according to the indication information that, a mode for performing random access procedure when an initiated multi-modal communication or service meets a target condition is a target random access mode ⟩~S202 performing the random access procedure in the target random access mode when a type of the initiated multi-modal communication or service is a second type, and a strength of a communication signal is greater than a second strength value ⟩~S2033

FIG. 5 receiving indication information sent by a base station ⟩~S201 determining according to the indication information that, a mode for performing random access procedure when an initiated multi-modal communication or service meets a target condition is a target random access mode ⟩~S202 performing the random access procedure in the target random access mode when a signal strength of a communication signal when initiating the multi-modal communication or service is greater than a signal strength value corresponding to a type of the initiated multi-modal communication or service in a first correspondence ⟩~S2034

FIG. 6

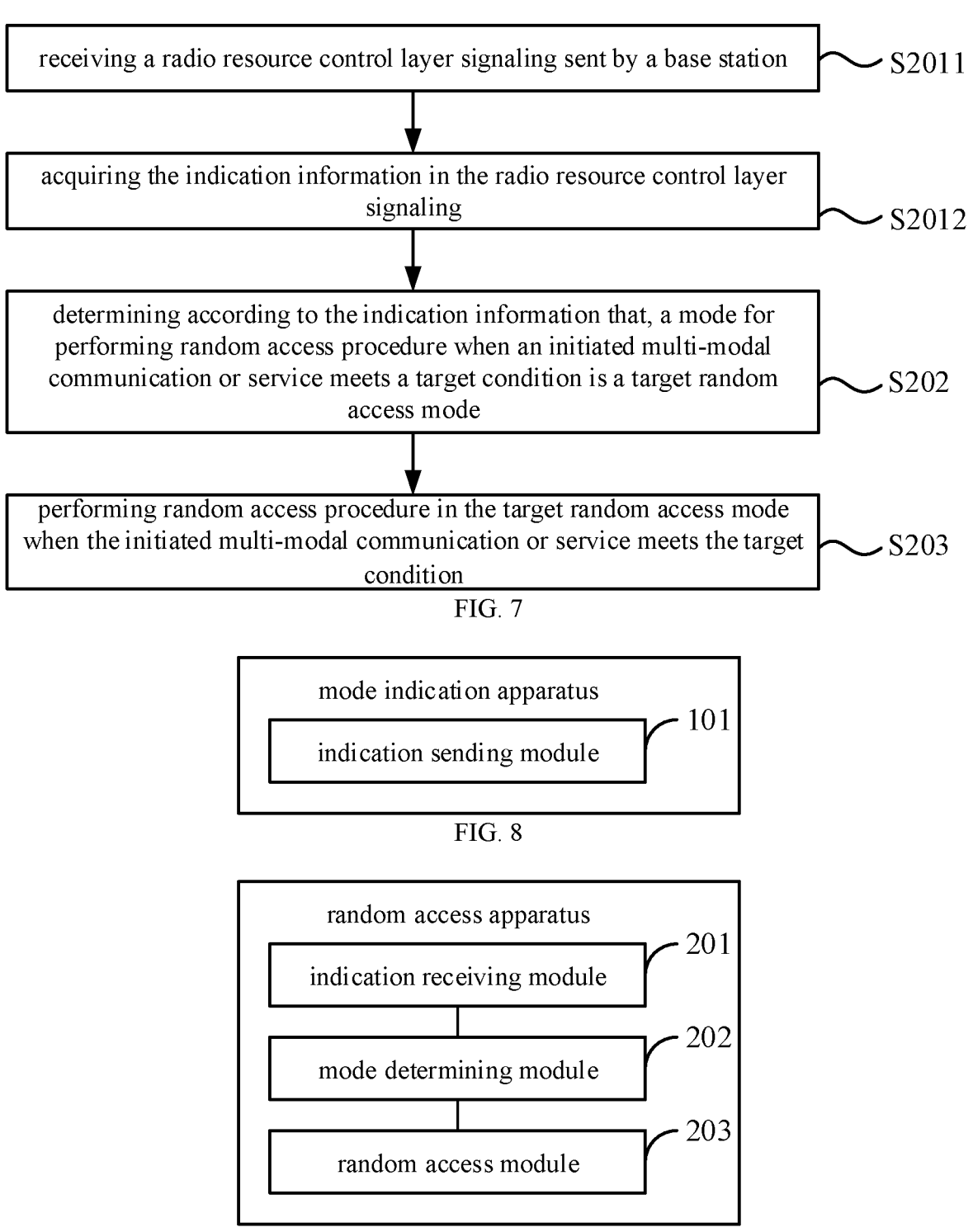

| receiving a radio resource control layer signaling sent by a base station | S2011 |

| acquiring the indication information in the radio resource control layer signaling | S2012 |

| determining according to the indication information that, a mode for performing random access procedure when an initiated multi-modal communication or service meets a target condition is a target random access mode | S202 |

| performing random access procedure in the target random access mode when the initiated multi-modal communication or service meets the target condition | S203 |

FIG. 7 mode indication apparatus indication sending module — 101

FIG. 8 random access apparatus indication receiving module — 201 mode determining module — 202 random access module — 203

RANDOM ACCESS METHOD AND DEVICE

CROSS-REFERENCE TO RELATED APPLICATION

This application is the US national phase application of International Application No. PCT/CN2020/105165, filed on Jul. 28, 2020, the entire contents of which are incorporated herein by reference for all purposes.

TECHNICAL FIELD

The present disclosure relates to the technical field of wireless communication networks, and in particular, to a random access method, a device, and a computer-readable storage medium.

BACKGROUND

With the formal commercialization and widespread adoption of 5G technology, research on the subsequent evolution of 5G technology has been put on the agenda. Intelligent interaction is considered an important application scenario in the subsequent technology development. The intelligent interaction refers to interaction generated between subjects of interaction (including people and things). Most of the existing interactions are passive and depend on the input(s) of requirements, such as voice interaction between people and smart home device(s), or visual interaction between people and smart home device(s). The smart home device(s) passively receive data input by people, and the input data is unimodal.

In the subsequent technical development, a multi-modality will become a normal state of operation. Inputs from a plurality of devices or a plurality of inputs from one device are sent to a centralized processing device, which will comprehensively process these inputs, thus finally obtaining one or more outputs that meet the user requirements. The plurality of outputs may also be output by the plurality of devices or one device.

SUMMARY

According to a first aspect of the present disclosure, there is provided a random access method, which is performed by a base station. The method includes:

sending indication information to a terminal, in which the indication information is configured to indicate the terminal to perform random access procedure in a target mode when an initiated multi-modal communication or service meets a target condition.

According to a second aspect of the present disclosure, there is provided a random access method, which is performed by a terminal. The method includes:

receiving indication information sent by a base station;

determining, according to the indication information, a target mode for performing random access procedure when an initiated multi-modal communication or service meets a target condition; and performing random access procedure in the target mode in response to the initiated multi-modal communication or service meeting the target condition.

According to a third aspect of embodiments of the present disclosure, there is provided an electronic device, including:

a processor; and a memory for storing instructions executable by the processor;

in which the processor is configured to implement the mode indication method described in any of the above-mentioned embodiments, and/or the random access method described in any of the above-mentioned embodiments.

BRIEF DESCRIPTION OF THE DRAWINGS

In order to illustrate the technical solutions in embodiments of the present disclosure more clearly, accompanying drawings used in the description of the embodiments will be briefly introduced below, and it is obvious that the accompanying drawings in the following description are only some embodiments of the present disclosure. For those skilled in the art, other accompanying drawings can also be obtained from these accompanying drawings without creative labor.

FIG. 1 is a flow chart showing a random access method applied to a base station, according to an embodiment of the present disclosure.

FIG. 2 is a flow chart showing a random access method applied to a terminal, according to an embodiment of the present disclosure.

FIG. 3 is a flow chart showing another random access method according to an embodiment of the present disclosure.

FIG. 4 is a flow chart showing yet another random access method according to an embodiment of the present disclosure.

FIG. 5 is a flow chart showing yet another random access method according to an embodiment of the present disclosure.

FIG. 6 is a flow chart showing yet another random access method according to an embodiment of the present disclosure.

FIG. 7 is a flow chart showing yet another random access method according to an embodiment of the present disclosure.

FIG. 8 is a block diagram showing a random access apparatus applied to a base station, according to an embodiment of the present disclosure.

FIG. 9 is a block diagram showing a random access apparatus applied to a terminal, according to an embodiment of the present disclosure.

DETAILED DESCRIPTION

Figure 10:
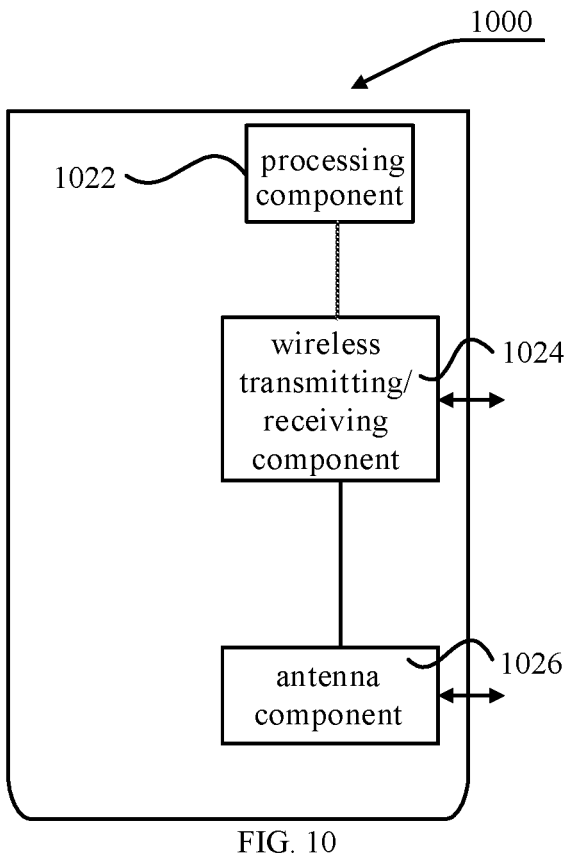
FIG. 10 is a block diagram showing an apparatus for random access applied to a base station, according to an embodiment of the present disclosure.

The technical solutions in embodiments of the present disclosure will be clearly and completely described below with reference to accompanying drawings in the embodiments of the present disclosure. Obviously, the described embodiments are only part of the embodiments of the present disclosure, but not all of the embodiments. Based on the embodiments in the present disclosure, all other embodiments obtained by those skilled in the art without creative labor shall fall within the protection scope of the present disclosure.

FIG. 1 is a flow chart showing a random access method according to an embodiment of the present disclosure. The method shown in the embodiment may be applied to a base station. The base station includes, but is not limited to, a 4G base station, a 5G base station, and a 6G base station, and the base station can communicate with a terminal which is a user equipment. The terminal includes, but is not limited to an electronic device, such as a mobile phone, a tablet computer, and a wearable device.

As shown in FIG. 1, the random access method may include the following step.

In step S101, indication information is sent to a terminal, in which the indication information is configured to indicate the terminal to perform random access procedure in a target mode when an initiated multi-modal communication or service meets a target condition.

In an embodiment, with the improvement of terminal capabilities, the terminal can already support the multi-modal communication or service, the terminal can support one type of multi-modal communication or service, or can also support a plurality of types of multi-modal communication or service. When the terminal initiates a multi-modal communication or service, the terminal may collect multi-modal information and then communicate with other devices (for example, a centralized processing device that centrally processes the multi-modal information) based on the multi-modal information.

For example, the type of multi-modal communication or service is real-time translation. The process of real-time translation may include collecting mouth images and voice information of the user(s), and outputting a translation result based on the mouth images and the voice information. The process may be performed by the terminal, then the translation result is sent to other device(s). The process nay also be performed by the terminal in cooperation with other device(s). For example, the terminal sends the mouth images and the voice information to other device(s), and the other device(s) output the translation result based on the mouth images and the voice information.

For example, the type of multi-modal communication or service is directional control. The process of directional control may include collecting body motion images and voice information of the user(s), and determining an object to be controlled and operations to be performed by the object based on the body motion images and the voice information. The process may be performed by the terminal, and then the result is sent to other device(s). The process may also be implemented by the terminal in cooperation with other device(s). For example, the terminal sends the body motion images and the voice information of the user to other device(s), and the other device(s) determine the object to be controlled and the operations to be performed by the object based on the body motion images and the voice information of the user.

Generally, transmission of multimodal information between the terminal and other devices may be performed by a network device such as a base station and a core network. The network device can support multi-modal communication or service initiated by the terminal. In order to communicate with the base station, the terminal first needs to perform a random access procedure to access the base station.

For the random access, taking contention based random access as an example, it mainly includes two modes, one is four-step random access (i.e., four-step random access mode), and the other is two-step random access (i.e., two-step random access mode).

The four-step random access procedure mainly includes four steps. First, a terminal sends a first message (MSG1) of random access to a base station, which mainly includes a preamble. The base station sends a second message (MSG2) of random access to the terminal after receiving the MGS1.

The MSG2 can also be referred to as a random access response (abbreviated as RAR), which mainly includes an identifier of the preamble and uplink resource allocation information. The terminal sends a third message (MSG3) of random access to the base station after receiving the MSG2, which mainly includes an identity of the terminal. The base station may send contention resolution information to the terminal after receiving the MSG3. The terminal may determine whether a communication connection can be established with the base station according to the contention resolution information.

The two-step random access procedure mainly includes two steps. First, the terminal sends a preamble and an identity to the base station. The base station may feed back information to the terminal after receiving the preamble and the identity of the terminal, and inform the terminal of a random access result by the feedback information, such as whether the contention is successfully solved, etc.

It can be seen that the steps included in the four-step random access are more than the steps included in the two-step random access. Therefore, compared with the two-step random access, the terminal initiates random access by the four-step random access, the speed of random access to the base station is slower, which will result in a large communication delay.

However, an allowed communication delay of the multi-modal communication or service initiated by the terminal under different conditions may be different. For example, the allowed communication delay of different types of multi-modal communication or service is different.

According to an embodiment of the present disclosure, the base station can send indication information to the terminal, and the indication information is used for indicating the terminal to perform the random access procedure in a target mode when the initiated multi-modal communication or service meets a target condition. Therefore, when the multi-modal communication or service is initiated, the terminal can select an appropriate mode to perform random access procedure based on whether the multi-modal communication or service meets the target condition, such that the random access procedure meets a requirement of the multi-modal communication or service.

The target mode may be the above-mentioned four-step random access mode, or may be the above-mentioned two-step random access mode. The target condition may be set as required.

Alternatively, the target condition is that a type of multi-modal communication or service initiated by the terminal is a first type.

In an embodiment, the target condition may be that the type of multi-modal communication or service initiated by the terminal is the first type. When a terminal initiates a multi-modal communication or service, the terminal may determine the type of the initiated multi-modal communication or service after receiving the indication information. The random access may be performed in the target mode when the type of multi-modal communication or service initiated is the first type.

For example, the allowed delay (i.e., communication delay) of the first type of multi-modal communication or service is relatively low (lower than a first threshold), and the target mode may be the two-step random access mode. Then, based on the indication information, the terminal may initiate random access procedure in the two-step random access mode, to access the base station for communication, when initiating the first type of multi-modal communication or service. This is beneficial to ensure that the random access procedure takes less time, so as to meet the requirements of the first type of multi-modal communication or service on a lower delay.

Alternatively, the target condition is that a signal strength of a communication signal is greater than a first strength value when the terminal initiates multi-modal communication or service. That is, a signal strength of a communication signal of the multi-modal communication or service is greater than a first strength value.

In an embodiment, the target condition may be that the signal strength of the communication signal is greater than the first strength value when the terminal initiates the multi-modal communication or service. The terminal may detect the signal strength of the communication signal when initiating the multi-modal communication or service after receiving the indication information.

It is to be noted that, in the embodiment and other embodiments, the base station can support the multi-modal communication or service initiated by the terminal. For example, the base station may choose to access a suitable core network device(s) to provide communication service for the multi-modal communication or service initiated by the terminal. The signal strength of the communication signal may be a signal strength of a signal received from the base station, and specifically, may be represented by reference signal receiving power (RSRP), reference signal receiving quality (RSRQ), etc.

When the signal strength is different, the probability of error occurs when the terminal communicates with the base station is different. Generally, the greater the signal strength, the smaller the probability of error occurs when the terminal communicates with the base station. For different random access modes, the cost of errors in the random access procedure is different, in which the cost of error in the two-step random access is higher. For example, if a random access procedure is performed in the two-step random access mode by a terminal, when an error occurs, the terminal needs to be re-initiate a two-step random access procedure, or it even needs to initiate a four-step random access procedure, that is, initiate a random access procedure in a four-step random access mode.

Therefore, the terminal may be indicated to perform a random access in the target mode when the signal strength is relatively high, for example, when the signal strength is greater than the first strength value. Here, the target mode may be the two-step random access mode. In this way, it can be ensured that the probability of error occurs during the random access procedure in the two-step random access mode is smaller, thus avoiding more problems caused by the error(s) in the two-step random access procedure.

Alternatively, the target condition is that a type of multi-modal communication or service initiated by the terminal is a second type, and a strength of a communication signal is greater than a second strength value.

In an embodiment, the target condition may be that the type of multi-modal communication or service initiated by the terminal is the second type, and the strength of the communication signal is greater than the second strength value. When the terminal initiates a multi-modal communication or service, the terminal can determine the type of the initiated multi-modal communication or service and the signal strength of the communication signal after receiving the indication information. The random access procedure may be performed in the target mode when the type of the initiated multi-modal communication or service is the second type and the strength of the communication signal is greater than the second strength value.

For example, the allowed delay of the second type of multi-modal communication or service is relatively low (lower than a second threshold), and the target mode may be the two-step random access mode. Then, based on the indication information, the terminal may initiate random access procedure in the two-step random access mode, to access the base station for communication, when initiating the second type of multi-modal communication or service. This is beneficial to ensure that the random access procedure takes less time, so as to meet the requirements of the first type of multi-modal communication or service on a lower delay. In addition, since the strength of the communication signal is relatively large, it is beneficial to ensure that the random access procedure in the two-step random access mode is successfully completed, and the error is less likely to occur.

It is to be noted that, the first type and the second type shown in the above-mentioned embodiments and subsequent embodiments may be set as required, and there may be no necessary connection between the first type and the second type. The two types may be different types or the same type.

Alternatively, the target condition is that a signal strength of a communication signal when the terminal initiates multi-modal communication or service is greater than a signal strength value corresponding to a type of the initiated multi-modal communication or service in a first association relationship. That is, a signal strength of a communication signal of the multi-modal communication or service is greater than a signal strength value corresponding to a type of the initiated multi-modal communication or service in a first association relationship.

Here, the first association relationship is used to represent an association relationship between the type of multi-modal communication or service and the signal strength value. That is, a type of multi-modal communication or service corresponds to at least one signal strength value.

In an embodiment, the target condition may be that the signal strength of the communication signal when the terminal initiates the multi-modal communication or service is greater than the signal strength value corresponding to the type of the initiated multi-modal communication or service in the first association relationship. The first association relationship may be pre-stored by the terminal, or set by the base station as required and further sent by the base station to the terminal by carrying it in the indication information.

After receiving the indication information, when initiating the multi-modal communication or service, the terminal can determine the type of the initiated multi-modal communication or service, and determine the signal strength value corresponding to the type of the initiated multi-modal communication or service according to the first association relationship. The random access can be performed in the target mode when the signal strength of the communication signal is greater than the signal strength value.

Accordingly, a corresponding signal strength value can be set for each type of multi-modal communication or service, which is used for comparing with the signal strength of the communication signal. In this way, it is ensured that random access procedure is performed in the target type random access mode when the signal strength of the communication signal meets the requirements of the corresponding type of multi-modal communication or service.

For example, in the first association relationship, the signal strength value corresponding to the third type of multi-modal communication or service is a third signal strength value. The terminal can determine whether the signal strength of the communication signal is greater than the third signal strength value when initiating the third type of multi-modal communication or service. The random access can be performed in the two-step random access mode when the signal strength of the communication signal is greater than the third signal strength value. Therefore, it is ensured that the signal strength of the communication signal meets the requirements of the third type of multi-modal communication or service, and that the random access is performed in the two-step random access mode which takes less time, thus meeting the requirements of the third type of multi-modal communication or service on a lower delay.

It is to be noted that, in various embodiments shown in the present disclosure, the first type, the second type and the third type may correspond to one type or a plurality of types, which may be set by the base station as required. That is, any two of the first type, the second type and the third type may refer to the same types, or refer to the different types.

Alternatively, the target mode is the two-step random access mode or the four-step random access mode.

Alternatively, the indication information is included in a radio resource control (abbreviated as RRC) layer signaling.

In an embodiment, the indication information may be specifically included in RACH-ConfigCommonTwoStepRA signaling. For example, information related to the target condition (i.e., indication information) may be added to the RACH-ConfigCommonTwoStepRA signaling. Taking the target condition is that the type of multi-modal communication or service initiated by the terminal is the first type as an example, then specified bit(s) in the RACH-ConfigCommonTwoStepRA signaling may be set to represent the first type.

Indication may be implemented by adjusting the existing signaling, or a newly defined signaling may also be set for indication. That is, the indication information can be carried through the adjusted existing signaling, or through the newly defined signaling. In an example, the target condition is that the type of multi-modal communication or service initiated by the terminal is the first type, and the indication information can be included in RACH-ConfigCommonTwoStepRA signaling, which belongs to adjusted existing signaling. In another example, the target condition is that the type of multi-modal communication or service initiated by the terminal is the first type, and the set newly defined signaling may be msgA-multi-modality-Type, which is dedicated to indicate the type of multi-modal communication or service indicated by the indication information. The terminal can determine the target condition according to the signaling.

For example, the first types specifically include a plurality of types, then the base station may send a plurality of pieces of msgA-multi-modality-Type signaling to the terminal, and each msgA-multi-modality-Type signaling indicates one first type. That is, one or more first types are set. Similarly, one or more second types are set. one or more third types are set.

FIG. 2 is a flow chart showing a random access method according to an embodiment of the present disclosure. The method shown in the embodiment may be applied to a terminal. The terminal includes, but is not limited to an electronic device, such as a mobile phone, a tablet computer, and a wearable device. The terminal can communicate with a base station, as a user equipment. The base station includes, but is not limited to, a 4G base station, a 5G base station, and a 6G base station.

As shown in FIG. 2, the random access method may include the following steps.

In step S201, indication information sent by a base station is received.

In step S202, a target mode for performing random access procedure when an initiated multi-modal communication or service meets a target condition is determined according to the indication information.

In step S203, the random access procedure is performed in the target mode when the initiated multi-modal communication or service meets the target condition.

According to embodiments of the present disclosure, the base station can send the indication information to the terminal, and based on the received indication information, when the multi-modal communication or service initiated by the terminal meets the target condition, the terminal can select the appropriate random access mode to perform random access procedure based on whether the multi-modal communication or service meets the target condition, such that the random access procedure meets a requirement of the multi-modal communication or service.

FIG. 3 is a flow chart showing another random access method according to an embodiment of the present disclosure. As shown in FIG. 3, performing the random access in the target mode when the initiated multi-modal communication or service meets the target condition includes step S2031.

In step S2031, the random access procedure is performed in the target mode when a type of the initiated multi-modal communication or service is a first type.

In an embodiment, the target condition may be that the type of multi-modal communication or service initiated by the terminal is the first type. When a terminal initiates a multi-modal communication or service, the terminal may determine the type of the initiated multi-modal communication or service after receiving the indication information. The random access can be performed in the target mode when the type of multi-modal communication or service initiated is the first type.

For example, the allowed delay (i.e., communication delay) of the first type of multi-modal communication or service is relatively low (lower than a first threshold), and the target mode may be the two-step random access mode. Then, based on the indication information, the terminal can initiate random access procedure in the two-step random access mode, to access the base station for communication, when initiating the first type of multi-modal communication or service. This is beneficial to ensure that the random access procedure takes less time, so as to meet the requirements of the first type of multi-modal communication or service on a lower delay.

FIG. 4 is a flow chart showing yet another random access method according to an embodiment of the present disclosure. As shown in FIG. 4, performing the random access procedure in the target mode when the initiated multi-modal communication or service meets the target condition includes step S2032.

In step S2032, the random access procedure is performed in the target mode when a signal strength of a communication signal is greater than a first strength value.

In an embodiment, the target condition may be that the signal strength of the communication signal is greater than the first strength value when the terminal initiates the multi-modal communication or service. The terminal may detect the signal strength of the communication signal when initiating the multi-modal communication or service, after receiving the indication information.

When the signal strength is different, the probability of error occurs when the terminal communicates with the base station is different. Generally, the greater the signal strength, the smaller the probability of error occurs when the terminal communicates with the base station. For different random access modes, the cost of errors in the random access procedure is different, in which the cost of errors in two-step random access is higher. For example, if a random access procedure is performed in the two-step random access mode by a terminal, when an error occurs, the terminal needs to be re-initiate a two-step random access procedure, or it even needs to initiate a four-step random access procedure, that is, initiate a random access procedure in a four-step random access mode.

Therefore, the terminal may be indicated to perform a random access in the target mode when the signal strength is relatively high, for example, when the signal strength is greater than the first strength value, in which the target mode may be the two-step random access mode. Therefore, it can be ensured that the probability of error occurs during the random access procedure in the two-step random access mode is smaller, thus avoiding more problems caused by error(s) in the two-step random access procedure.

FIG. 5 is a flow chart showing yet another random access method according to an embodiment of the present disclosure. As shown in FIG. 5, performing the random access in the target mode when the initiated multi-modal communication or service meets the target condition includes step S2033.

In step S2033, the random access is performed in the target mode when a type of the initiated multi-modal communication or service is a second type and a strength of a communication signal is greater than a second strength value In an embodiment, the target condition may be that the type of multi-modal communication or service initiated by the terminal is the second type, and the strength of the communication signal is greater than the second strength value. When the terminal initiates a multi-modal communication or service, the terminal can determine the type of the initiated multi-modal communication or service and the signal strength of the communication signal after receiving the indication information. The random access procedure can be performed in the target mode when the type of the initiated multi-modal communication or service is the second type and the strength of the communication signal is greater than the second strength value.

For example, the allowed delay of the second type of multi-modal communication or service is relatively low (lower than a second threshold), and the target mode may be the two-step random access mode. Then, based on the indication information, the terminal can initiate random access procedure in the two-step random access mode, to access the base station for communication, when initiating the second type of multi-modal communication or service. This is beneficial to ensure that the random access procedure takes less time, so as to meet the requirements of the first type of multi-modal communication or service on a lower delay. In addition, since the strength of the communication signal is relatively large, it is beneficial to ensure that the random access procedure in the two-step random access mode is successfully completed, and errors are less likely to occur.

FIG. 6 is a flow chart showing yet another random access method according to an embodiment of the present disclosure. As shown in FIG. 6, performing the random access in the target mode when the initiated multi-modal communication or service meets the target condition includes step S2034.

In step S2034, the random access is performed in the target mode when a signal strength of a communication signal when initiating the multi-modal communication or service is greater than a signal strength value corresponding to a type of the initiated multi-modal communication or service in a first association relationship.

Here, the first association relationship is used to represent an association relationship between the type of multi-modal communication or service and the signal strength value. That is, a type of multi-modal communication or service corresponds to at least one signal strength value.

In an embodiment, the target condition may be that the signal strength of the communication signal when the terminal initiates the multi-modal communication or service is greater than the signal strength value corresponding to the type of the initiated multi-modal communication or service in the first association relationship. The first association relationship may be pre-stored by the terminal, or may be carried in the indication information and sent by the base station to the terminal.

After receiving the indication information, when initiating the multi-modal communication or service, the terminal may determine the type of the initiated multi-modal communication or service, and determine the signal strength value corresponding to the type of the initiated multi-modal communication or service according to the first association relationship. The random access can be performed in the target mode when the signal strength of the communication signal is greater than the signal strength value.

Accordingly, a corresponding signal strength value can be set for each type of multi-modal communication or service, which is used for comparing with the signal strength of the communication signal. In this way, it is ensured that random access procedure is performed in the target type random access mode when the signal strength of the communication signal meets the requirements of the corresponding type of multi-modal communication or service.

For example, in the first association relationship, the signal strength value corresponding to the third type of multi-modal communication or service is a third signal strength value. The terminal can determine whether the signal strength of the communication signal is greater than the third signal strength value when initiating the third type of multi-modal communication or service. The random access can be performed in the two-step random access mode when the signal strength of the communication signal is greater than the third signal strength value. Therefore, it is ensured that the signal strength of the communication signal meets the requirements of the third type of multi-modal communication or service, and that the random access is performed in the two-step random access mode which takes less time, thus meeting the requirements of the third type of multi-modal communication or service on a lower delay.

Alternatively, the target mode is a two-step random access mode or a four-step random access mode.

FIG. 7 is a flow chart showing yet another random access method according to an embodiment of the present disclosure. As shown in FIG. 7, receiving the indication information sent by the base station includes step S2011 and step S2012.

In step S2011, a radio resource control layer signaling sent by a base station is received.

In step S2012, the indication information is acquired in the radio resource control layer signaling.

In an embodiment, the indication information may be specifically included in RACH-ConfigCommonTwoStepRA signaling. For example, information related to the target condition (i.e., indication information) may be added to the RACH-ConfigCommonTwoStepRA signaling. Taking the target condition is that the type of multi-modal communication or service initiated by the terminal is the first type as an example, then specified bit(s) in the RACH-ConfigCommonTwoStepRA signaling may be set to represent the first type.

Indication may be implemented by adjusting the existing signaling, or a newly defined signaling may also be set for indication. That is, the indication information can be carried through the adjusted existing signaling, or through the newly defined signaling. In an example, the target condition is that the type of multi-modal communication or service initiated by the terminal is the first type, and the indication information can be included in RACH-ConfigCommonTwoStepRA signaling, which belongs to adjusted existing signaling. In another example, the target condition is that the type of multi-modal communication or service initiated by the terminal is the first type, and the set new signaling may be msgA-multi-modality-Type, which is dedicated to indicate the type of multi-modal communication or service indicated by the indication information. The terminal can determine the target condition according to the signaling.

For example, the first types specifically include a plurality of types, then the base station may send a plurality of pieces of msgA-multi-modality-Type signaling to the terminal, and each msgA-multi-modality-Type signaling indicates one first type. That is, one or more first types are set. Similarly, one or more second types are set. one or more third types are set.

Corresponding to the above-mentioned embodiments of the mode indication method and the random access method, the present disclosure also provides embodiments of a mode indication apparatus and a random access apparatus.

FIG. 8 is a block diagram showing a random access apparatus according to an embodiment of the present disclosure. The apparatus shown in the embodiment may be applied to a base station. The base station includes, but is not limited to, a 4G base station, a 5G base station, and a 6G base station, and the base station can communicate with a terminal which is a user equipment, The terminal includes, but is not limited to an electronic device, such as a mobile phone, a tablet computer, and a wearable device.

As shown in FIG. 8, the random access apparatus may include an indication sending module 101.

The indication sending module 101 is configured to send indication information to a terminal, in which the indication information is configured to indicate the terminal to perform random access procedure in a target mode when an initiated multi-modal communication or service meets a target condition.

Alternatively, the target condition is that a type of multi-modal communication or service initiated by the terminal is a first type.

Alternatively, the target condition is that a signal strength of a communication signal is greater than a first strength value when the terminal initiates multi-modal communication or service.

Alternatively, the target condition is that a type of multi-modal communication or service initiated by the terminal is a second type, and a strength of a communication signal is greater than a second strength value.

Alternatively, the target condition is that a signal strength of a communication signal when the terminal initiates multi-modal communication or service is greater than a signal strength value corresponding to a type of the initiated multi-modal communication or service in a first association relationship.

Alternatively, the target mode is a two-step random access mode or a four-step random access mode.

Alternatively, the indication information is included in a radio resource control signaling.

FIG. 9 is a block diagram showing a random access apparatus according to an embodiment of the present disclosure. The apparatus shown in the embodiment may be applied to a terminal. The terminal includes, but is not limited to an electronic device, such as a mobile phone, a tablet computer, and a wearable device. The terminal can communicate with a base station, as a user equipment. The base station includes, but is not limited to, a 4G base station, a 5G base station, and a 6G base station.

As shown in FIG. 9, the random access apparatus may include an indication receiving module 201, a mode determining module 202, and a random access module 203.

The indication receiving module 201 is configured to receive indication information sent by a base station.

The mode determining module 202 is configured to determine according to the indication information, a target mode for performing random access procedure when an initiated multi-modal communication or service meets a target condition.

The random access module 203 is configured to perform random access procedure in the target mode when the initiated multi-modal communication or service meets the target condition.

Alternatively, the random access module is configured to perform the random access procedure in the target mode when a type of the initiated multi-modal communication or service is a first type.

Alternatively, the random access module is configured to perform the random access procedure in the target mode when a signal strength of a communication signal is greater than a first strength value.

Alternatively, the random access module is configured to perform the random access procedure in the target mode when a type of the initiated multi-modal communication or service is a second type, and a strength of a communication signal is greater than a second strength value.

Alternatively, the random access module is configured to perform the random access procedure in the target mode when a signal strength of a communication signal when initiating the multi-modal communication or service is greater than a signal strength value corresponding to a type of the initiated multi-modal communication or service in a first association relationship.

Alternatively, the target mode is a two-step random access mode or a four-step random access mode.

Alternatively, the indication receiving module is configured to receive a radio resource control layer signaling sent by a base station; and acquire the indication information in the radio resource control layer signaling.

With respect to the apparatuses in the above-mentioned embodiments, the specific ways for performing operations for individual modules therein have been described in detail in the embodiments regarding the methods, which will not be elaborated herein.

Since the apparatus embodiments substantially correspond to the method embodiments, reference is made to the partial description of the method embodiments. The above-described apparatus embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. It would be appreciated and executable by those skilled in the art without creative efforts.

An embodiment of the present disclosure also provides an electronic device, including:

a processor; and a memory for storing instructions executable by the processor;

in which the processor is configured to implement the mode indication method described in any of the above-mentioned embodiments, and/or the random access method described in any of the above-mentioned embodiments.

An embodiment of the present disclosure further provides a computer-readable storage medium having stored therein a computer program that, when executed by a processor, causes the processor to implement steps of the mode indication method described in any of the above-mentioned embodiments, and/or steps of the random access method described in any of the above-mentioned embodiments.

As shown in FIG. 10, FIG. 10 is a block diagram showing an apparatus 1000 for mode indication according to an embodiment of the present disclosure. The apparatus 1000 may be provided as a base station. Referring to FIG. 10, the apparatus 1000 includes a processing component 1022, a wireless transmitting/receiving component 1024, an antenna component 1026, and a signal processing portion specific to a wireless interface, in which the processing component 1022 may further include one or more processors. One of the processors in the processing component 1022 may be configured to implement the mode indication method described in any of the above-mentioned embodiments.

Figure 11:
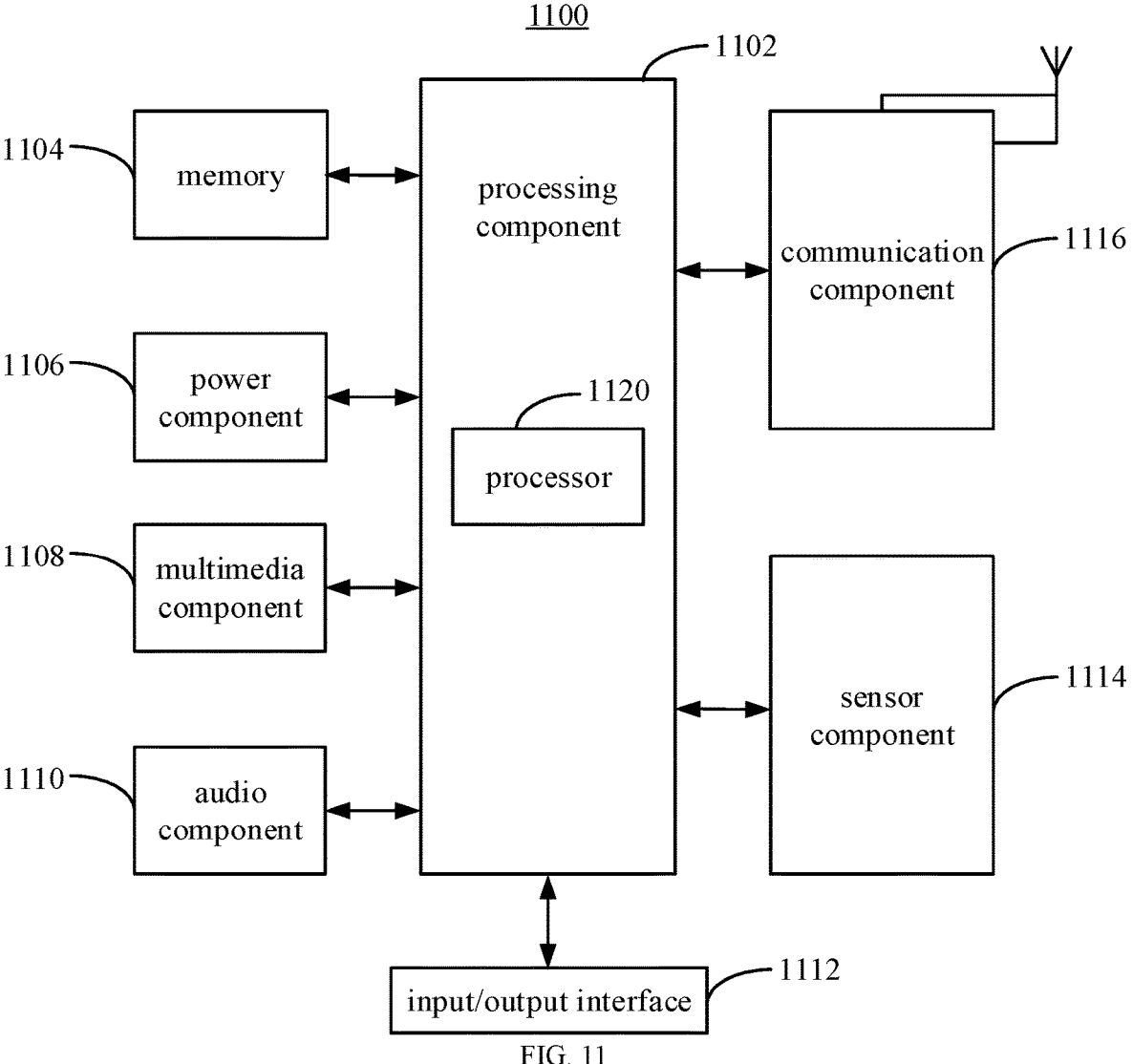
FIG. 11 is a block diagram showing an apparatus for random access according to an embodiment of the present disclosure.

FIG. 11 is a block diagram showing an apparatus 1100 for random access according to an embodiment of the present disclosure. For example, apparatus 1100 may be a mobile phone, computer, digital broadcast terminal, messaging device, game console, tablet device, medical device, fitness device, personal digital assistant, and the like.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the apparatus 1100, such as the operations associated with display, phone calls, data communications, camera operations, and recording operations. The processing component 1102 can include one or more processors 1120 to execute instructions to perform all or some of the steps in the above-described random access method. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, videos, etc. The memory 1104 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as keyboards, click wheels, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or an component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may include a light sensor, such as a CMOS or CCD image sensor, for use in imaging applications. In some embodiments, the sensor component 1114 may further include an accelerometer sensor, a gyroscope sensor, a magnetic sensor, a pressure sensor, or a temperature sensor.

The communication component 1116 is configured to facilitate communication, wired or wireless, between the apparatus 1100 and other devices. The apparatus 1100 can access a wireless network based on a communication standard, such as WiFi, 2G, or 3G, 4G LTE, 5G NR or a combination thereof. In an illustrative embodiment, the communication component 1116 receives a broadcast signal or broadcast associated information from an external broadcast management system via a broadcast channel. In an illustrative embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-mentioned random access method.

In an illustrative embodiment, there is also provided a non-transitory computer readable storage medium including instructions, such as included in the memory 1104, executable by the processor 1120 in the apparatus 1100, for completing the above-mentioned random access method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure described here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the embodiments of the present disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and apparatuses provided by the embodiments of the present disclosure have been described in detail above, and specific examples are used to illustrate the principle and implementation of the present disclosure. The description of the above embodiments is only used to help understand the methods and core ideas of the present disclosure. At the same time, for those skilled in the art, there will be some changes in the specific implementation and application scope according to the idea of the present disclosure. In summary, the content of the specification should not be construed as a limitation to the present disclosure.

What is claimed is:

1. A random access method, performed by a base station, comprising:
   sending indication information to a terminal, wherein the indication information is configured to indicate the terminal to perform random access procedure in a target mode when an initiated multi-modality communication or service meets a target condition;
   wherein the target condition is one of:
   a signal strength of a communication signal is greater than a first strength value when the terminal initiates multi-modality communication or service; or
   a type of multi-modality communication or service initiated by the terminal is a second type, and a strength of a communication signal is greater than a second strength value; or
   a signal strength of a communication signal when the terminal initiates multi-modality communication or service is greater than a signal strength value corresponding to a type of the initiated multi-modality communication or service in a first association relationship;
   wherein the first association relationship represents an association relationship between the type of multi-modality communication or service and the signal strength value.

2. The method of claim 1, wherein the target mode is a two-step random access mode or a four-step random access mode.

3. The method of claim 1, wherein the indication information is included in a radio resource control signaling.

4. The method of claim 1, wherein the signal strength is represented by reference signal receiving power (RSRP) or reference signal receiving quality (RSRQ).

5. The method of claim 1, wherein the first association relationship is carried in the indication information and sent from the base station to the terminal.

6. A random access method, performed by a terminal, comprising:
   receiving indication information sent by a base station;
   determining, according to the indication information, a target mode for performing random access procedure when an initiated multi-modality communication or service meets a target condition; and
   performing random access procedure in the target mode when the initiated multi-modality communication or service meets the target condition;
   wherein performing the random access procedure in the target mode when the initiated multi-modality communication or service meets the target condition comprises:
   performing the random access procedure in the target mode when a signal strength of a communication signal is greater than a first strength value; or
   performing the random access procedure in the target mode when a type of the initiated multi-modality communication or service is a second type, and a strength of a communication signal is greater than a second strength value; or performing the random access procedure in the target mode when a signal strength of a communication signal when initiating the multi-modality communication or service is greater than a signal strength value corresponding to a type of the initiated multi-modality communication or service in a first association relationship;

wherein the first association relationship represents an association relationship between the type of multi-modality communication or service and the signal strength value.

7. The method of claim 6, wherein the target mode is a two-step random access mode or a four-step random access mode.

8. The method of claim 6, wherein receiving the indication information sent by the base station comprises:

receiving a radio resource control layer signaling sent by a base station; and acquiring the indication information in the radio resource control layer signaling.

9. The method of claim 6, wherein the signal strength is represented by reference signal receiving power (RSRP) or reference signal receiving quality (RSRQ).

10. The method of claim 6, wherein the first association relationship is carried in the indication information and sent from the base station to the terminal.

11. A base station, comprising:

at least one processor; and at least one memory for storing instructions executable by the at least one processor;

wherein the at least one processor is configured to:

send indication information to a terminal, wherein the indication information is configured to indicate the terminal to perform random access procedure in a target mode when an initiated multi-modality communication or service meets a target condition;

wherein the target condition is one of:

a signal strength of a communication signal is greater than a first strength value when the terminal initiates multi-modality communication or service; or a type of multi-modality communication or service initiated by the terminal is a second type, and a strength of a communication signal is greater than a second strength value; or a signal strength of a communication signal when the terminal initiates multi-modality communication or service is greater than a signal strength value corresponding to a type of the initiated multi-modality communication or service in a first association relationship;

wherein the first association relationship represents an association relationship between the type of multi-modality communication or service and the signal strength value.

12. The base station of claim 11, wherein the target mode is a two-step random access mode or a four-step random access mode.

13. The base station of claim 11, wherein the indication information is included in a radio resource control signaling.

14. A terminal, comprising:

at least one processor; and at least one memory for storing instructions executable by the at least one processor, wherein the at least one processor is configured to:

receive indication information sent by a base station;

determine, according to the indication information, a target mode for performing random access procedure when an initiated multi-modality communication or service meets a target condition; and perform random access procedure in the target mode when the initiated multi-modality communication or service meets the target condition;

wherein the at least one processor is configured to:

perform the random access procedure in the target mode when a signal strength of a communication signal is greater than a first strength value; or perform the random access procedure in the target mode when a type of the initiated multi-modality communication or service is a second type, and a strength of a communication signal is greater than a second strength value; or perform the random access procedure in the target mode when a signal strength of a communication signal when initiating the multi-modality communication or service is greater than a signal strength value corresponding to a type of the initiated multi-modality communication or service in a first association relationship;

wherein the first association relationship represents an association relationship between the type of multi-modality communication or service and the signal strength value.

15. The terminal of claim 14, wherein the target mode is a two-step random access mode or a four-step random access mode.

16. The terminal of claim 14, wherein the at least one processor is configured to:

receive a radio resource control layer signaling sent by a base station; and acquire the indication information in the radio resource control layer signaling.

* * * * *